J. E. Atwood,
Saw Teeth,
Nº 60,321.                    Patented Dec. 11, 1866.

Witnesses
James Rogers
Will Johnson

Inventor.
JAMES. E. ATWOOD.

United States Patent Office.

IMPROVEMENT IN SAWS.

JAMES E. ATWOOD, OF TRENTON, NEW JERSEY.

Letters Patent No. 60,321, dated December 11, 1866.

The Schedule referred to in these Letters Patent and making part of the same.

TO ALL WHOM IT MAY CONCERN:

Be it known that I, JAMES E. ATWOOD, of Trenton, in the county of Mercer, and State of New Jersey, have invented a new and improved mode of Inserting Saw Teeth; and I do hereby declare that the following is a full and exact description thereof, reference being had to the accompanying drawings, and to the letters of reference marked thereon, in which—

Figure 1:
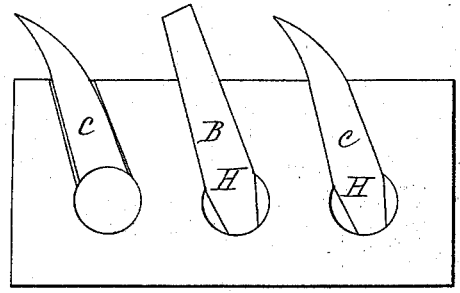
Figure 2:
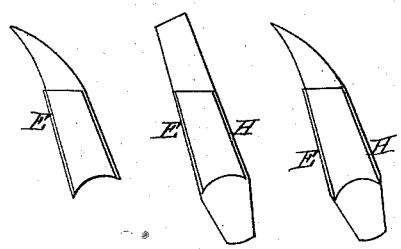
Figure 3:
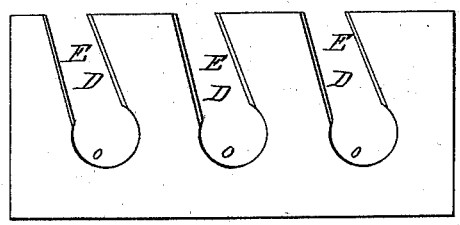

Figure 1 is a perspective view.
Figure 2, a section.
Figure 3, a section.

Letter A, in fig. 1, is the saw-plate. Letter B is a chisel-form cutter. Letters $c\ c$ are common saw-teeth. Letters H H, in fig. 2, are the form of teeth used in my improvement. Letters E E E are the grooves. Letters D D D, in fig. 3, are insertions to receive the teeth H H. Letters E E E are corresponding grooves, as in fig. 2. Letters $o\ o\ o$ are the base for the teeth H H to rest on. I construct my saw-plate in any of the known forms, and insert my improved teeth in the following manner. I cut out the insertion D D D, as shown in fig. 3, with a common die or punch. The grooves E E E are made by filing off each side of the insertion so as to form a male groove; then I cut out the teeth H H in the form of fig. 2. The teeth are made one-fourth of an inch wider than the insertion. Then plane or file out the female groove to fit the corresponding groove in fig. 3. To insert the teeth H H into the insertion D D D, all that is needed is to bend the lower part of the teeth H H about the thickness of the saw-plate; then drive said teeth into said groove, and straighten the part bent back, and it will rest on the bottom, at $o\ o\ o$; then hammer and grind the saw in the manner well known to those skilled in the art.

I do not claim the principle of inserting saw-teeth; but hat I do claim, and desire to secure by Letters Patent, is—

I claim the teeth H H, when inserted and secured in the manner herein described, and for the purposes set forth.

JAMES E. ATWOOD.

Witnesses:
JAMES ROGERS,
WM. JOHNSTON.